United States Patent
Paolini et al.

(10) Patent No.: US 6,847,948 B1
(45) Date of Patent: Jan. 25, 2005

(54) METHOD AND APPARATUS FOR SECURE DISTRIBUTION OF SOFTWARE/DATA

(75) Inventors: Michael A. Paolini, Round Rock, TX (US); Rabindranath Dutta, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/466,953

(22) Filed: Dec. 20, 1999

(51) Int. Cl.[7] ............................................. G06F 17/60
(52) U.S. Cl. .............................. 705/56; 705/1; 380/277
(58) Field of Search ........................ 705/1, 56; 380/277

(56) References Cited

U.S. PATENT DOCUMENTS

| | | | | |
|---|---|---|---|---|
| 4,453,074 A | * | 6/1984 | Weinstein | 235/380 |
| 4,866,769 A | | 9/1989 | Karp | 380/4 |
| 5,113,518 A | | 5/1992 | Durst, Jr. et al. | 395/550 |
| 5,291,598 A | | 3/1994 | Grundy | 395/650 |
| 5,402,490 A | | 3/1995 | Mihm, Jr. | 380/21 |
| 5,509,070 A | | 4/1996 | Schull | 380/4 |
| 5,652,793 A | * | 7/1997 | Priem et al. | 705/56 |
| 5,717,930 A | | 2/1998 | Imai et al. | 395/712 |
| 5,757,907 A | * | 5/1998 | Cooper et al. | 380/277 |
| 5,870,543 A | * | 2/1999 | Ronning | 707/9 |
| 5,935,243 A | | 8/1999 | Hasebe et al. | 713/200 |
| 6,006,190 A | * | 12/1999 | Baena-Arnaiz et al. | 705/1 |
| 6,018,712 A | * | 1/2000 | Pactong | 705/1 |
| 6,067,622 A | * | 5/2000 | Moore | 380/45 |
| 6,073,123 A | * | 6/2000 | Staley | 705/51 |

FOREIGN PATENT DOCUMENTS

| | | | | |
|---|---|---|---|---|
| JP | 05334254 | | 12/1993 | G06F/15/00 |
| JP | 09034799 | | 2/1997 | G06F/12/14 |
| JP | 11007384 | | 1/1999 | G06F/9/06 |
| JP | 2002312051 | * | 10/2002 | G06F/17/50 |

OTHER PUBLICATIONS

Schneier, Bruce Applied Cryptography, second edition, 1996. p. 173.*

* cited by examiner

Primary Examiner—James P. Trammell
Assistant Examiner—John Winter
(74) Attorney, Agent, or Firm—Marilyn Smith Dawkins; Dillon & Yudell LLP

(57) ABSTRACT

A method and apparatus is disclosed for preventing an unauthorized computer system from using copied software or data. An identification code provided by a client computer is combined with a pre-determined number provided by the source of software or data to be copied to generate at least one unique encryption key. Prior to each use the encrypted program re-derives the original encryption key, which includes the identification code of the client computer, to decrypt the critical files prior to use. The identification code may be a unique identifier associated with the client computer such as a network identifier or a processor ID provided by the client computer.

26 Claims, 2 Drawing Sheets

METHOD AND APPARATUS FOR SECURE DISTRIBUTION OF SOFTWARE/DATA

BACKGROUND OF THE INVENTION

1. Technical Field

The present invention relates in general to data processing systems and in particular to transferring data to a data processing system. More particularly, the present invention relates to a secure method of transferring software and/or data to a data processing system.

2. Description of the Related Art

Computers are widely employed by individuals to conduct everyday transactions and a large personal computing industry has developed as a result. The personal computing industry includes not only the production and marketing of hardware (personal computers), but also development and commercial distribution of software. The software sector of the personal computing industry is marked by fierce competition. The possible consequences of copyright, trademark, and patent infringement seem to have little effect in dissuading the illegal reproduction, distribution and use of retail software. Elaborate schemes have been hatched to prevent illegal copying of software from diskettes, CD ROMs and other media. These efforts are directed not only at software pirates, but also at individuals who permit casual, but illegal copying of software which they legally own.

The efforts to prevent illegal copying of personal software distributed via hard copy in the form of diskettes or CD ROMs, or via soft copy in the form of downloaded software, are all lumped under the term "copy protection." The term copy protection includes a host of known and widely reported techniques aimed at detection and prevention of illegal copying. One technique involves insertion into software of artifacts whose locations are randomly determined when the software is initially placed on a diskette, and which can only be reproduced under the original copying conditions. When illegal copying is attempted, the artifacts are obliterated and their absence is detected by a process in the software which reacts by altering the software program.

In view of the substantial and continuing black market in illegal personal computing software, additional effective schemes for copy protection are needed. It would be desirable, therefore, to provide a method and apparatus that will prevent illegal use of software or data obtained from a software source. Further, it would be desirable to provide a deterrent to illegal use, but which may not include literal copying to a computer's persistent memory such as a hard drive.

SUMMARY OF THE INVENTION

It is therefore one object of the present invention to provide a method and apparatus for preventing an unauthorized computer system from operating or utilizing software or data.

It is another object of the present invention to provide a method and apparatus that will prevent unauthorized operation of software without requiring additional hardware, such as a dongle.

It is yet another object of the present invention to provide a method and apparatus that will allow a vendor to provide software that is connected by a personal ID and a system ID to prevent unauthorized use of software.

It is yet another object of the present invention to provide a method and apparatus that will require the input of multiple authorizations to enable operation of the software.

The foregoing objects are achieved as is now described. A method is disclosed for preventing an unauthorized computer system from using copied software or data. An identification code provided by a client computer is combined with a pre-determined number provided by the source of software to generate a unique encryption key. Prior to each use the encrypted program re-derives the original encryption key, which includes an identification code provided by the client computer, to decrypt critical files prior to operation. The client identification code may be any of a number of individual, unique identifiers associated with the client computer such as a network identifier, a processor ID provided by the client computer or a smart card number provided by a smart card reader attached to the client computer. Additionally, as the client computer ID number is not tied to an operating system license number, the ID number utilized by the present invention allows for operating system update or reformatting of a hard drive, among other things, without the need to change security codes.

The above as well as additional objects, features, and advantages of the present invention will become apparent in the following detailed written description.

DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
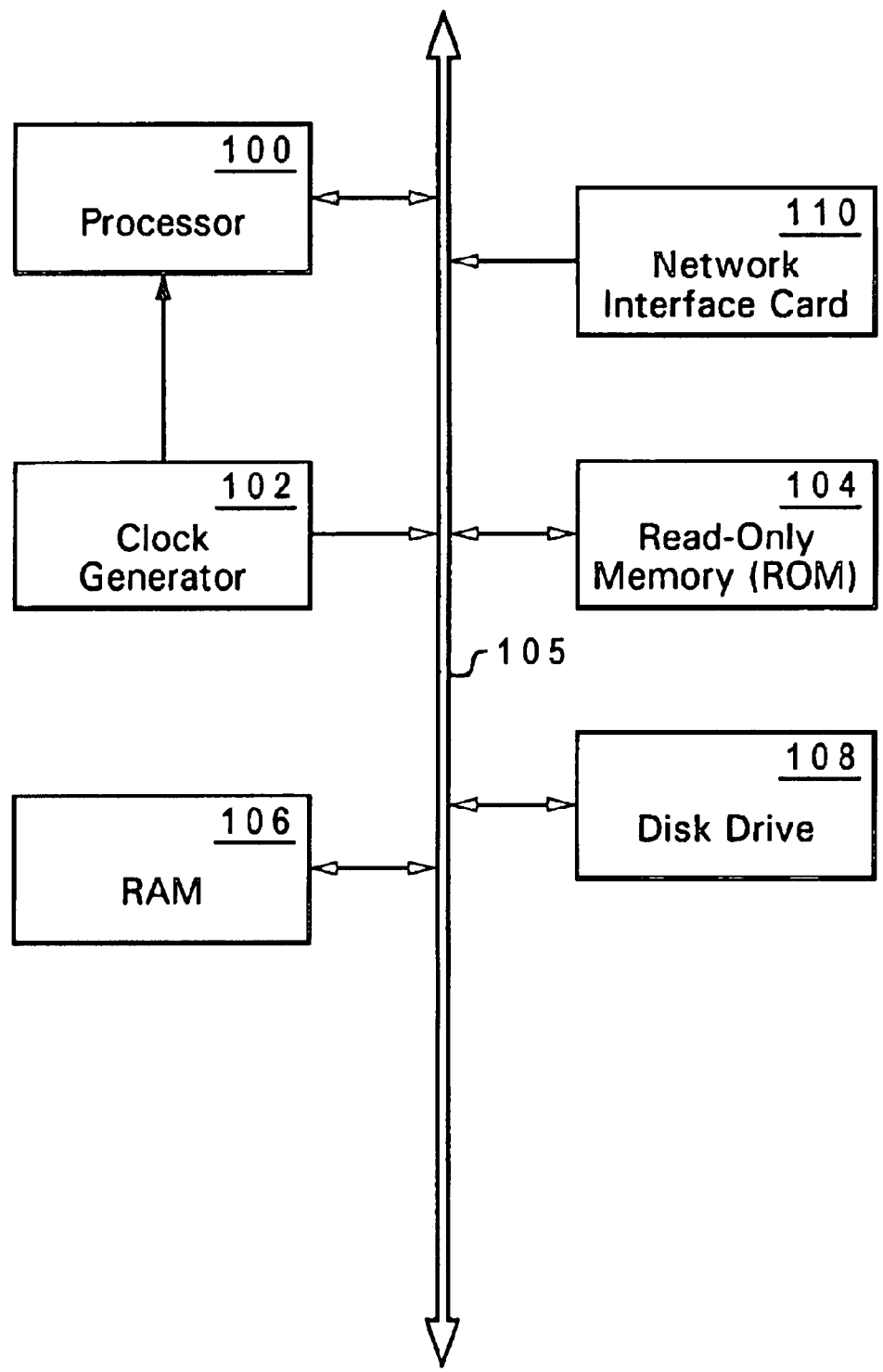
FIG. 1 depicts a block diagram of a typical configuration of a client computer, such as a computer with in which a preferred embodiment of the present invention may be implemented.

Referring now to the drawings, and in particular to FIG. 1, a block diagram of a typical configuration of a client computer in which a preferred embodiment of the present invention may be implemented, is depicted. As used herein, the expression client computer is intended to mean a digital computer system or any other system that uses or operates with software. As shown, this configuration includes a processor 100, a random access memory (RAM) 106, a read only memory (ROM) 104 or indirectly, to a data and control bus 105 by which data and control signals are transmitted from one element to another, generally under the control of processor 100.

Processor 100 may be identified as a function of its family membership. For instance, the Pentium III™ a product of Intel Corporation of San Jose, Calif., is encoded during the manufacturing process with a unique CPU identifier (CPU ID). The CPU ID of the processor is useful in ascertaining the ID of the computer system illustrated in FIG. 1. As mentioned above, the CPU ID of the computer system may serve to identify that computer system and to distinguish it from others, even though such other computer systems may include the same processor and the same or similar peripheral devices. The present invention proceeds on the basis that, once the CPU ID of a particular computer system is determined, a software program which includes the CPU ID will be executed only on a computer system having very same CPU ID. Moreover, it is contemplated that the CPU ID of the computer system which first initializes the software will be encrypted in that software. Hence, if the software is copied, the ID likewise is copied. Consequently, if attempts are made to use the copied software on any other computer system, the fact that such other computer system exhibits a different ID prevents such usage. Additionally, even though the CPU ID is used in this preferred embodiment, any other ID unique to the client computer may be used in the encryption process including, a network Interface card ID, a smart card number entered utilizing a reader, etc. An arbitrary number provided by the operator of the client computer could be utilized but then security could more easily be compromised.

A clock generator 102 is coupled to processor 100 and also to data and control bus 105. As is conventional, clock generator 102 functions to synchronize the operations of processor 100 with other peripheral devices coupled to bus 105. Read only memory (ROM) 104 is conventional and, as is understood by those of ordinary skill in the art, stores basic programs and data which are used by processor 100 to carry out various operations. Data is read from ROM 104 and supplied to processor 100 by way of bus 105. Random access memory (RAM) 106 is coupled to bus 105 by a conventional memory access control (not shown).

Disk drive 108 may take the form of a floppy disk drive or a fixed disk drive, the latter also being referred to as "hard" or "Winchester" disk drive. Disk drive 108 includes one or more read/write heads for recording and reproducing (i.e. writing and reading) data. For a floppy disk drive, a single magnetic disk may be provided, and one or both surfaces of this disk may be used to store data. If disk drive 108 comprises a hard disk drive, several individual platters may be provided therewith; and each surface of each platter may be scanned by one or more read/write heads for reading or writing data thereon. Disk drive controller(not shown) which is a conventional device, controls the operation of disk drive 108 in response to data read/write commands from processor 100 and is coupled to bus 105 to permit data to be communicated between disk drive 108 and bus 105.

Network Interface Card 110, provides a connection between the client computer and a network. Communication between network connected devices, including the client computer, takes place over network connections. Generally, the network interface is an aftermarket card inserted into the computer. Each network interface card (NIC) has a separate, unique number assigned by the manufacturer and there is no other network card produced by any other manufacturer that has that number. The unique NIC number may be a first level of ID for the client computer on any network. As discussed in more detail in FIG. 2, the NIC ID may also be used alone as a unique ID or in combination with the computer's unique processor ID to provide a client identifier.

The various elements illustrated in FIG. 1 are conventional and operate in a manner known to those of ordinary skill in the art. Thus, in the interest of brevity, further description of these elements, their interaction and their operation is not provided.

Figure 2A:
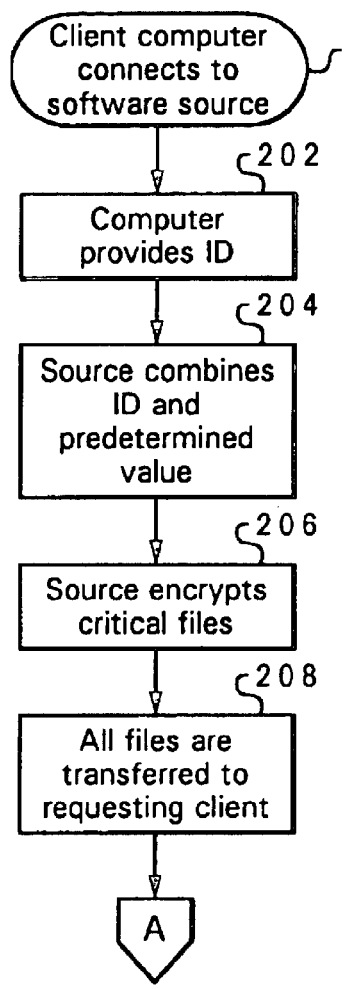
FIG. 2A is a process for transferring software and data to a client computer in accordance with a preferred embodiment of the present invention.

Referring to FIG. 2A, a process for transferring software and data to a client computer in accordance with a preferred embodiment of the present invention, is illustrated. The process begins with step 200, which illustrates a client computer connecting with a software source. The connection may be made through a Local Area Network (LAN), a Wide Area Network (WAN), the Internet or any software source capable of adding encryption prior to downloading any files. The purpose for connecting to the software source is to download at least a portion of the software. For example, the majority of a large program might be shipped via mass media (cd rom, diskette) and the download of a subset of encrypted files is needed to complete the installation. In the case of software for sale on the Internet, the purpose for connecting to a software source (a site on the Internet) may include purchasing and then downloading the software.

The process proceeds to step 202, which illustrates one or more unique identification codes (IDs)being transmitted to the software source. In a preferred embodiment this ID(s) (for instance, multiple pentium III's in a multiple processor system) is comprised of a special identifier with processors that have unique identifiers incorporated during the manufacturing process. An example of the genre is Pentium III™, a processor manufactured by Intel Corporation of San Jose, Calif. The client computer may instead transmit a network machine address code, provided by a network interface card that connects the computer to the network, if the processor does not have a unique identifier. Additionally, any other unique ID peculiar to the client computer may be provided including, a smart card number provided to the software source through a reader attached to the client computer or a value determined through use of a biometric reader such as voice pattern encoder/decoder or fingerprint reader. Even a number provided by the operator of the client computer could be used (e.g. Social Security number, license number), but the security of the encryption key is considered low-level and more easily compromised.

The ID can be obtained by the software source by different methods depending on the vendor of the software. An operator of the client computer may transmit the CPU ID of the computer in response to a request by the vendor. The CPU ID may also be obtained by the software source sending a query direct to the client computer without directly notifying the operator. In summary, one or more unique identifiers associated with the client computer or the operator of the client computer is provided to the software source for the purpose of incorporating the identifier into an encryption key(s).

The process then passes to step 206, which illustrates the software encrypting files in the software and/or data to be downloaded. This step provides that certain files critical to operation of the program, are encrypted so that the program will not run unless those files are decrypted. Assume that the software is comprised of the following files:

a.dll;
b.exe;
c.dat;
d.bat; and
e.exe;

where a.dll and e.exe are the critical files. The software source encrypts a.dll using the encryption key of 53-77 (or 5353-7777) and generates a file adash.dll. Also, the software encrypts e.exe using the encryption key of 53-77 (or 535353-777777) and generates a file edash.exe. Though two types of keys are shown, there is no restriction on how the encryption is performed, just the key parts—a part relating to the client computer or user and a part relating to the software itself. The software cannot be operated if either part is not present during the startup of the software. It is not necessary to encrypt every file, just the critical ones that enable operation of the program.

The process continues to step 208, which illustrates the encrypted files: adash.exe, b.exe, c.dat, d.exe and edash.exe being sent to the client computer. For decryption the predetermined value provided by the software source may sent directly to the client/buyer to add to the software to enable operation. On the other hand, the predetermined value could be included within the software so that the unique identifier provided by the client number is determined automatically by the program at runtime. The files are transferred to hard disk, or persistent memory, on the computer. In the instance of a thin client computer, the software is on an intermediary or proxy (i.e. a central server) and use of the thin client's unique ID limits operation of the software to that one thin client.

Figure 2B:
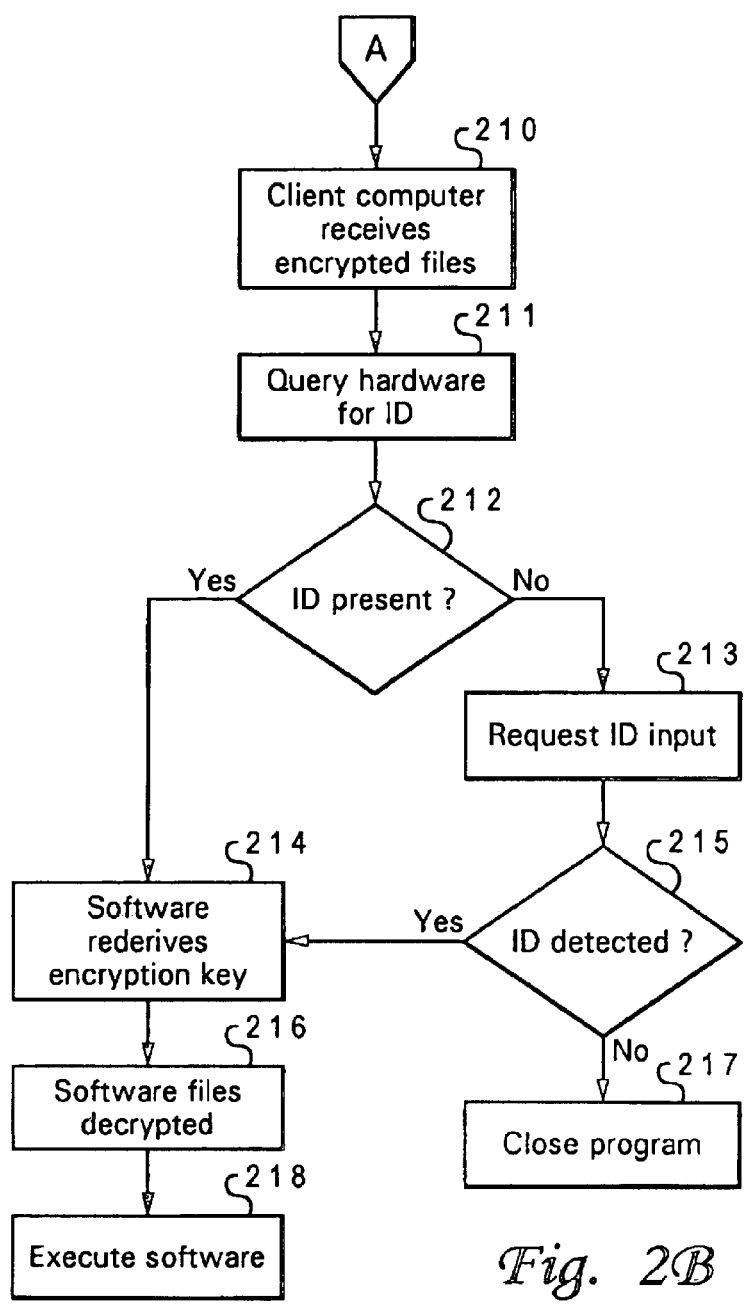
FIG. 2B depicts a process for receiving and operating encrypted files in a client computer in accordance with a preferred embodiment of the present invention.

Referring now to FIG. 2B, a process for receiving and operating encrypted files in a client computer in accordance with a preferred embodiment of the present invention is depicted. The process begins with step 210, which depicts encrypted files having been transferred to the client computer from a software source. The process passes to step 212, which illustrates the client starting to run the software package and in the case where a license number (any predetermined value provided by the software source) is available within the downloaded software, the software package queries the hardware for the client ID (CPU ID, Network interface card, etc.). The software uses the license number and the client ID to generate the encryption key— 53-77. The process then passes to step 214, which illustrates using a predetermined value in a re-derivation of the encryption key on the computer to decrypt the encrypted software. The software decrypts adash.dll to a.dll and edash.exe to e.exe using the encryption key—53-77. The key is not exposed to the user and for purposes of this illustration symmetric encryption/decryption methodology has been used. Variations based on asymmetric encryption/decryption keys may also be used.

The process continues to step 214, which depicts the critical files of the downloaded software being decrypted by an application provided on the client computer or transferred from the software source in the download process, in the thin client case, by combining the predetermined value with the client computer ID used in the encryption process. The process passes to step 216, which illustrates execution of the software. In a very secure version, a.dll and e.exe are never available at the same time in storage/memory, thus preventing discovery of the characteristics of the critical software and making it more difficult to seize the software in an unencrypted form by making a copy of the memory so as to create a new executable.

In one embodiment, when the downloaded files run, the encryption key is re-derived by combining the predetermined value and the client computer's unique ID in a known way utilizing software sent with the downloaded files. Additionally, the unique ID is checked or queried each time the software is run. The program uses this key to decrypt the installed critical files that were encrypted. Should the program be installed on or copied to another machine, critical files cannot be decrypted due to the lack of the original machine identifier and the downloaded files are therefore useless.

It is possible to query for multiple unique ID's (e.g., two or more smart cards) and it is possible to create multiple decryption keys. For example, accounting software for a company using the present invention may encrypt one or more portions of the program that allows changing of sensitive areas (like salary, etc.). That particular area could use a single encryption key representing a combination of two or more smart card IDs (e.g., the Chief Financial Officer and the chief accountant) plus the software serial number. Also, the software could be encrypted two or more times such that each encryption corresponded to one unique ID plus the serial number. This would mean that all keys would have to be present to run this section of the software. Another example would be where different files within the application could be encoded with different encryption keys requiring all keys to be present and entered for the software to operate. The above illustrations are examples of various encryption means and a person skilled in the will understand that the examples should not be construed to encompass all means of encryption for the present invention.

In summary, the present invention provides for a secure method to purchase and download software to a client computer. Further, the present invention provides that the may only be operated on a specific, the client, computer. The client computer connects to a software source and requests a download. In a preferred embodiment, the software source would require payment or authorization to download. After receipt of authorization or payment, the client computer provides a unique ID (a Pentium III ID, a Network Card ID, a smart card number provided by a connected smart card reader, a fingerprint of the user provided by an appropriate fingerprint reader, etc.) to the source. The software source combines the unique ID and a predetermined value (a license number or a serial number of the program to download, a randomly generated number, etc.) to generate an encryption key for the software.

Critical files required to operate the software are encrypted using the encryption key. These files could be made available to a purchaser of a software application after the purchaser receives a CD ROM containing the bulk of the application files. By encrypting only the files necessary to operate the software, the computing and encryption overhead is reduced. After the critical files are encrypted, all files are then made available to the client computer by a full download from the software source or utilizing two different methods of fulfillment. The predetermined value is sent along with the encrypted files and the operator of the client computer enters that value to commence operation of the software.

If the program is copied to another machine, the encrypted files (utilizing the original client computer's unique ID) prevent operation of the software, even if the predetermined value is known. However, if the client computer ID is a portable number, such as a smart card number, the software may be copied to another computer and the smart card number and the predetermined value could be entered to operate the software as long as that smart card was present at the time of operation.

Security is most effective when utilizing a device ID peculiar to a client computer thus requiring software operation on the subject client computer. A smart card, which provides a method to purchase the downloaded software and a portion of the encryption key would provide a security measure that would allow movement of the software to another computer that has a smart card reader attached. Still, operation would be able to take place only on a machine that is able to utilize the smart card.

In the manner of the present invention, security of downloaded files is provided utilizing a unique identifier from a requesting computer's own processor. In a computer with a processor that does not have a unique identifier, a network interface card (also unique to the client computer) identifier may be used instead, when connected to a software source through a network (including a thin client network computer). Additionally, downloaded software is able to operate only on the system to which the software was downloaded by utilizing an encryption and decryption process that requires incorporation of the unique identifier. In other words, the software may not operate on a system that does not contain the identifier, unique to the particular client computer, used in the encryption process.

Further, it is important to understand that the combination of a unique, client computer supplied ID in combination with a software source supplied value provides a very secure and simple to implement method for downloading software. A client computer system can supply multiple IDs (multiple processors, a network card, multiple smart cards, etc.) providing for even more security. Multiple IDs may be combined in various combinations with software source provided software license or serial number to provide even more security. Utilizing multiple ID codes to operate the software provides increased security and provides multiple fingerprints for tracking a hacker if for some reason security is breached.

It is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally, regardless of the particular type of signal bearing media utilized to actually carry out the distribution. Examples of computer readable media include: nonvolatile, hard-coded type media such as read only memories (ROMs) or erasable, electrically programmable read only memories (EEPROMs), recordable type media such as floppy disks, hard disk drives and CD-ROMs, and transmission type media such as digital and analog communication links.

The invention has been particularly shown and described with reference to a preferred embodiment, it will be understood by those skilled in the art that various changes in form and detail may be made therein without departing from the spirit and scope of the invention.

What is claimed is:

1. A method for transferring software, said method comprising the steps of:
   connecting a client computer to a software source;
   sending at least one unique hardware identifier, provided by said client computer, to said software source;
   combining, at said software source, said at least one unique hardware identifier and a predetermined value, associated with said software source, to generate an encryption key;
   encrypting at said software source at least a portion of said software utilizing said encryption key;
   transmitting said encrypted at least a portion of said software to said client computer;
   combining, at said client computer, said at least one unique hardware identifier and said predetermined value, associated with said software source, to generate said encryption key; and
   directly decrypting at said client computer said encrypted at least a portion of said software utilizing said encryption key.

2. The method of claim 1, wherein said at least one unique hardware identifier is a unique CPU identifier.

3. The method of claim 1, wherein said at least one unique hardware identifier is a unique network interface card identifier.

4. The method of claim 1, wherein said at least one unique hardware identifier is a smart card number provided by said client computer.

5. The method of claim 1, wherein said predetermined value associated with said software is a software license number.

6. The method of claim 1, wherein said predetermined value associated with said software is a software serial number.

7. The system of claim 1, wherein said predetermine value associated with said software is a randomly generated number.

8. A method for transferring software and data, said method comprising the steps of:
   connecting a client computer to a software source;
   receiving a unique network interface card identifier from said client computer;
   combining said unique network interface card identifier and a predetermined value from said software source to generate an encryption key;
   encrypting at said software source a pre-determined critical file in said software utilizing said at least one encryption key, said pre-determined critical file being less than all of said software and said pre-determined critical file being required to execute said software; and
   transmitting said encrypted pre-determined critical file to said client computer.

9. A method for transferring software and data, comprising the steps of:
   connecting a client computer to a software source;
   receiving at least one unique central processing unit (CPU) identifier from said client computer;
   combining said at least one unique CPU identifier and a predetermined value associated with said software source to generate an encryption key at said software source;
   encrypting a portion of said software utilizing said encryption key;
   transmitting said encrypted portion of said software to said client computer;
   combining said at least one unique CPU identifier and said predetermined value associated with said software source to generate said encryption key at said client computer; and
   directly decrypting said portion of said software utilizing said encryption key in said client computer.

10. A system for transferring software, said system comprising:
    connection means for connecting a software source to a client computer;
    communication means for sending a unique hardware identifier provided by said client computer to said software source;
    logic for combining said unique hardware identifier and a predetermined value, associated with said software, to generate an encryption key in said software source and said client computer;
    encryption means associated with said software source for encrypting at least a portion of said software, utilizing said encryption key; and
    decryption means associated with said client computer for decrypting said pre-determined critical files utilizing said encryption key.

11. The system of claim 10, wherein said unique hardware identifier is a unique central processing unit (CPU) identifier of said client computer.

12. The system of claim 10, wherein said unique hardware identifier is a network interface card identifier of said client computer.

13. The system of claim 10, wherein said unique hardware identifier is a smart card number provided by said client computer.

14. The system of claim 10, wherein said predetermined value associated with said software is a software license number.

15. The system of claim 10, wherein said predetermined value associated with said software is a software serial number.

16. The system of claim 10, wherein said predetermined value associated with said software is a randomly generated number.

17. A client computer for receiving software, said client computer comprising:

connection means for connecting to a software source;

communication means for sending a unique hardware identifier provided by said client computer to said software source; and means for receiving said software, said software being encrypted utilizing an encryption key derived from said unique hardware identifier and a predetermined value associated with said software;

means for generating said encryption key utilizing said unique hardware identifier and said predetermined value associated with said software; and means for directly decrypting said encrypted software at said client computer utilizing said encryption key.

18. The client computer of claim 17, wherein said unique hardware identifier is a unique central processing unit (CPU) identifier of said client computer.

19. The client computer of claim 17, wherein said unique hardware identifier is a network interface card identifier in said client computer.

20. The client computer of claim 17, wherein said unique hardware identifier is a smart card number provided by said client computer.

21. The client computer of claim 17, wherein said predetermined value associated with said software is a software serial number.

22. The client computer of claim 17, wherein said predetermined value associated with said software is a software license number.

23. A server for transferring software to a requesting client computer, said server comprising:

a connection apparatus for connecting to said client computer;

reception means for receiving a unique hardware identifier from said client computer;

logic for combining said unique hardware identifier and a predetermined value, associated with said software, to generate an encryption key;

encryption logic for encrypting a predetermined critical file, said pre-determined critical file being less than all of said software, utilizing said encryption key; and transmission means for transferring said encrypted critical file of said software to said client computer.

24. The server of claim 23, wherein said unique hardware identifier of said client computer is a unique central processing unit (CPU) identifier.

25. The server of claim 23, wherein said unique hardware identifier of said requesting client computer is a network interface card identifier.

26. A computer program product in a computer readable medium having instructions for transferring software to a requesting client computer, said computer program product comprising:

instructions for connecting a client computer to a software source;

instructions for sending at least one unique hardware identifier of said client computer to said software source;

instructions for combining said at least one unique hardware identifier and a predetermined value, associated with said software source, to generate an encryption key at said software source;

instructions for encrypting at said software source at least a portion of said software utilizing said encryption key;

instructions for transmitting said encrypted at least a portion of said software to said client computer;

instructions for combining, at said client computer, said at least one unique hardware identifier and said predetermined value, associated with said software source, to generate said encryption key at said client computer; and instructions for directly decrypting at said client computer said encrypted software utilizing said encryption key.

* * * * *